Patented Feb. 20, 1934

1,947,945

UNITED STATES PATENT OFFICE 1,947,945

AZO DYES

Werner Lange, Dessau-Ziebigk in Anhalt, Germany, assignor to General Aniline Works, Inc., New York, N. Y., a corporation of Delaware No Drawing. Application January 4, 1933, Serial No. 650,163, and in Germany May 6, 1932

16 Claims. (Cl. 260—72)

My present invention relates to a process for manufacturing azo dyes and to the new products obtainable according to this process.

It is a modification of my earlier invention described in U. S. Patent No. 1,896,710, dated Feb. 7, 1933.

I have found that substitution products of 4-nitro-1.3-diaminobenzene that contain no further negative substituents, such as chlorine, the nitro or sulfonic acid group, may be diazotized to form a monodiazo compound and that the latter may be coupled with any azo component in an acid, neutral or alkaline medium under formation of azo dyes. As substituents contained in 4-nitro-1.3-diaminobenzene I enumerate the alkyl and the alkoxy group.

The azo dyes obtainable according to my invention may be further diazotized either in substance or on the fiber and coupled with azo components. The monoazo dyes containing sulfonic acid radicles, dye wool or leather or other animal fibers from an acid dyeing bath, while such dyes containing a greater number of azo groups substantively dye cotton. The monoazo dyes containing no sulfonic acid or carboxylic acid radicles serve as pigments or fat dyes; alternatively, they may be used for dyeing acetyl cellulose and the products made thereof. They too may be diazotized on the fiber and coupled with further azo components.

The invention is illustrated by the examples following hereafter, the parts being by weight:—

*Example 1.*—16.7 parts of 1-methyl-2.4-diamino-5-nitrobenzene are dissolved with 25 parts of hydrochloric acid of 20° Bé. in 100 parts of water. The suspension obtainable by introducing the solution into a mixture of ice and water, is monodiazotized at 0° C. by addition of a solution of 6.9 parts of sodium nitrite. When nitrous acid is no longer detectable in the mixture, a solution of 14.9 parts of diethylaminobenzene, acid by the presence of hydrochloric acid, is added and a solution of sodium acetate is slowly introduced until free hydrochloric acid is no longer found. After the coupling is complete, the mixture is made acid with hydrochloric acid and the precipitated dye is separated from the liquid. For purifying it, it is again stirred with water and sodium carbonate in excess and newly precipitated. From an aqueous suspension it dyes acetate silk fast orange tints.

If the diethyl-aminobenzene be replaced by 13.7 parts of 1-methyl-3-amino-4-methoxybenzene, a dye is obtained which likewise gives on acetate silk orange but somewhat redder dyeings.

N-methylaniline-ω-sulfonate may likewise be coupled with a monodiazo compound mentioned above, whereat, however, coupling is finished by adding sodium carbonate and continuing stirring until the diazo compound is no longer detectable. After saponification a dye is obtained which is soluble in fats and hydrocarbons with yellow color.

When coupling the monodiazo compound in question in an alkaline medium with 1-methyl-4-hydroxybenzene, a dye is produced which dyes fats and hydrocarbons with yellow color and which in an aqueous suspension dyes acetylcellulose green yellow tints.

*Example 2.*—To the monodiazo compound obtainable according to Example 1, a solution of 14.7 parts of 1-aminonaphthalene, acid by the presence of hydrochloric acid, is added and the mixture is stirred for some hours until the diazo compound has disappeared. The insoluble dye formed is separated from the liquid. In the dry state it forms a black powder soluble in fats and hydrocarbons with a Bordeaux color and dyeing acetylcellulose fast red tints which become violet black by diazotizing and developing with 2-hydroxynaphthalene-3-carboxylic acid.

When substituting 1-ethylaminonaphthalene for 1-aminonaphthalene, one obtains a dye dyeing acetylcellulose bright brown tints, while substitution by 2-aminonaphthalene yields a reddish brown tint.

*Example 3.*—The monodiazo compound obtainable according to Example 1, is allowed to run while cooling in an aqueous solution of 30.4 parts of 2-hydroxynaphthalene-3.6-disulfonic acid, held alkaline by addition of sodium carbonate. When the coupling has finished, the dye is separated by addition of common salt. In the dry state it forms a brown black powder which dyes wool orange brown tints from an acid dyeing bath.

*Example 4.*—To the diazo compound prepared according to Example 1, an aqueous suspension of 31.9 parts of 2-amino-8-hydroxynaphthalene-3.6-disulfonic acid is added simultaneously with such a quantity of sodium acetate that the reaction of hydrochloric acid disappears. The mixture is stirred for some hours. The coupling finished, sodium carbonate is added and the dye is separated by common salt. It forms in the dry state a black powder which dyes wool Bordeaux tints in an acid dyeing bath.

Dyes similar to those described in the foregoing examples are obtainable when using as starting material 1-methoxy-2.4-diamino-5-nitrobenzene instead of 1-methyl-2.4-diamino-5-nitrobenzene the application of which is described in the following example.

*Example 5.*—1-methoxy-2.4-diamino-5-nitrobenzene is used as starting material which is obtainable by nitrating 1-methoxy-2.4-diacetaminobenzene and cleaving off the acetyl radicles. It forms orange crystals melting at 166° C.

36.6 parts of the said 1-methoxy-2.4-diamino-5-nitrobenzene are dissolved in a warm mixture of 50 parts of concentrated hydrochloric acid and 200 parts of water and are separated in a finely subdivided form by slowly pouring the solution into a mixture of ice and water. Then diazotization is carried out at 0° C. by addition of a solution of 13.8 parts of sodium nitrite, and the diazo compound is allowed to run into an alkaline solution of the monoazo dye prepared from 31.9 parts of diazotized 1-amino-8-hydroxy-naphthalene-3.6-disulfonic acid and 11 parts of 1.3-dihydroxybenzene. After the coupling is complete, the dye is separated by addition of common salt and worked up in the usual manner. It dyes from an acid dyeing bath leather deeply brown tints, which are somewhat redder than those produced from the analogous dyes prepared from 1.3-diamino-4-nitrobenzene.

A similar dye is obtainable when substituting 1-amino-8-hydroxynaphthalene-4.6-disulfonic acid for the corresponding 3.6-disulfonic acid mentioned above.

*Example 6.*—The mono diazo dye obtainable according to Example 5 from 1-amino-8-hydroxynaphthalene-3-6- or 4.6-disulfonic acid and resorcinol, in a first stage is coupled with the diazo compound obtained fom 13.8 parts of para- or meta-mononitroaminobenzene. To the reaction mixture then the diazo compound is added, obtainable under the conditions mentioned in Example 5, from 16.3 parts of 1-methoxy-2.4-diamino-5-nitrobenzene, whereat the reaction mixture further is kept alkaline. The dye worked up in the usual manner, is similar to that described in Example 5; it dyes leather somewhat redder tints.

*Example 7.*—The diazo compound of 16.7 parts of 1-methyl-2.4-diamini-5-nitrobenzene or of 16.3 parts of 1-methoxy-2.4-diamino-5-nitrobenzene obtained in the manner mentioned above, is added while cooling to a solution of 25.4 parts of 4'-sulfophenyl-3-methyl-5-pyrazolone kept alkaline by the presence of sodium carbonate. The dye separated in the usual manner dyes wool reddish yellow tints having a good fastness to light.

In the foregoing examples I have given a number of possibilities how the monodiazo compound of 1-methyl-2.4-diamino-5-nitrobenzene or 1-methoxy-2.4-diamino-5-nitrobenzene may be used for the manufacture of azo dyes by coupling it with azo components of different kind. However, my invention is not limited to these components of the benzene, naphthalene or pyrazolone series and other valuable dyes are likewise obtainable with other substitution products of these components or with, for instance, dihydroxyquinoline, aceto acetic acid anilides and similar compounds well known in the art. Instead of 1-methyl or 1-methoxy-2.4-diamino-5-nitrobenzene I may use the homologous compounds of these products.

What I claim is:—

1. The process which comprises monodiazotizing a meta-diamine of the benzene series of the general formula

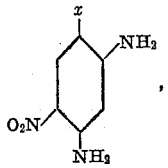

wherein $x$ means alkyl or —O·alkyl, and coupling the monodiazo compound with an azo component.

2. The process which comprises mono-diazotizing a meta-diamine of the benzene series of the general formula

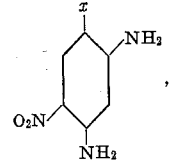

wherein $x$ means methyl or —O·methyl, and coupling the monodiazo compound with an azo component.

3. The process which comprises monodiazotizing a meta-diamine of the benzene series of the general formula

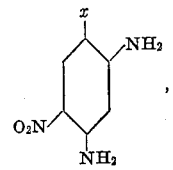

wherein x means methyl or —O·methyl, and coupling the monodiazo compound with an azo component of the group consisting of amino, hydroxy and aminohydroxy compounds of the naphthalene and the benzene series.

4. The process which comprises monodiazotizing a meta-diamine of the benzene series of the general formula

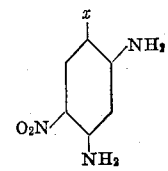

wherein $x$ means methyl or —O·methyl, and coupling the monodiazo compound with an azo component of the group consisting of sulfonic acids of amino, hydroxy and aminohydroxy compounds of the naphthalene and the benzene series.

5. The process which comprises monodiazotizing a meta-diamine of the benzene series of the general formula

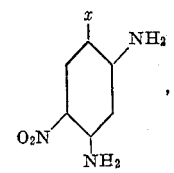

wherein $x$ means methyl or —O·methyl, and coupling the monodiazo compound with a hydroxy-azo dye capable of reacting with a diazo compound.

6. The process which comprises monodiazotizing a meta-diamine of the benzene series of the general formula

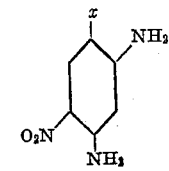

wherein $x$ means methyl or —O· methyl, and coupling the monodiazo compound with 8-hydroxynaphthalene disulfonic acid-1-azo-resorcinol in an alkaline medium.

7. The process which comprises monodiazotizing 1-methyl-2.4-diamino-5-nitrobenzene and coupling the monodiazo compound with 8-hydroxynaphthalene disulfonic acid-1-azo-resorcinol in an alkaline medium.

8. The process which comprises monodiazotizing 1-methoxy-2.4-diamino-5-nitrobenzene and coupling the monodiazo compound with 8-hydroxynaphthalene disulfonic acid-1-azo-resorcinol in an alkaline medium.

9. The azo dyes probably corresponding to the general formula

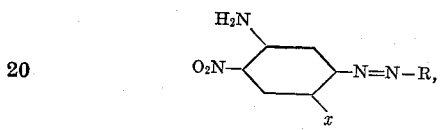

wherein R means the radicle of an azo component and $x$ means alkyl or —O· alkyl.

10. The azo dyes probably corresponding to the general formula

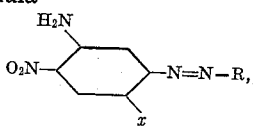

wherein R means the radicle of an azo component and $x$ means methyl or —O· methyl.

11. The azo dyes probably corresponding to the general formula

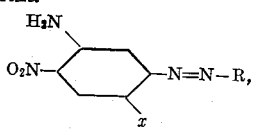

wherein R means the radicle of an azo component of the benzene or naphthalene series and $x$ means methyl or —O· methyl.

12. The azo dyes probably corresponding to the general formula

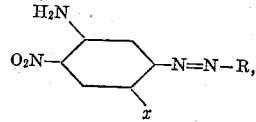

wherein R means the radicle of an azo component of the benzene or naphthalene series bearing a sulfonic acid group and $x$ means methyl or —O· methyl.

13. The azo dyes probably corresponding to the general formula

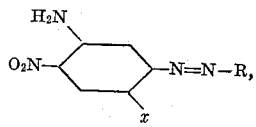

wherein R means the radicle of a hydroxyazo dye and $x$ means alkyl or —O· alkyl.

14. The azo dyes corresponding to the general formula

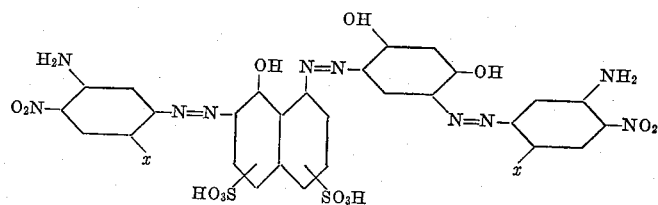

wherein $x$ means methyl or —O· methyl, said dyes being in the dry state brown to black powders, soluble in water and dyeing leather clear brown tints.

15. The azo dyes corresponding to the general formula

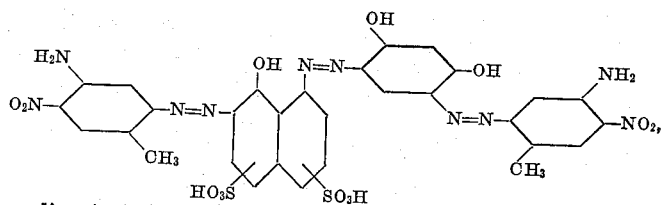

said dyes being in the dry state brown to black powders, soluble in water and dyeing leather clear brown tints.

16. The azo dyes corresponding to the general formula

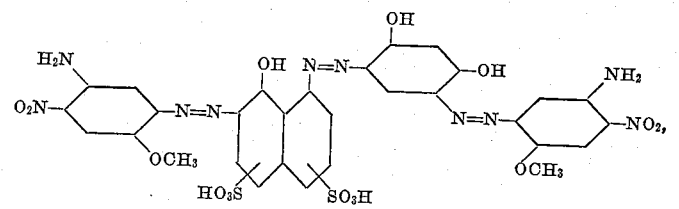

said dyes being in the dry state brown to black powders, soluble in water and dyeing leather clear brown tints.

WERNER LANGE.